252-95 AU 166 EX
8/8/78 XR 4,105,399

United States Patent [19]

Luthi

[11] 4,105,399

[45] Aug. 8, 1978

[54] OPTICALLY BRIGHTENING WITH A SYNERGISTIC MIXTURE

[75] Inventor: Christian Luthi, Basel, Switzerland

[73] Assignee: Ciba-Geigy Corporation, Ardsley, N.Y.

[21] Appl. No.: 717,846

[22] Filed: Aug. 26, 1976

Related U.S. Application Data

[62] Division of Ser. No. 497,970, Aug. 16, 1976, Pat. No. 4,008,166.

[30] Foreign Application Priority Data

Sep. 5, 1973 [CH] Switzerland ........................ 12736/73

[51] Int. Cl.$^{2}$ .......................... D06L 3/12; C11D 7/26; C09K 13/00

[52] U.S. Cl. .......................................... 8/1 W; 8/111; 8/137; 252/89 R; 252/95; 252/301.24

[58] Field of Search .......................... 8/1 W, 137, 111; 252/301.24

[56] References Cited

U.S. PATENT DOCUMENTS

| | | | |
|---|---|---|---|
| 2,956,898 | 10/1960 | Fleck | 8/1 W |
| 3,449,257 | 6/1969 | Tuite et al. | 252/301.33 |
| 3,649,623 | 3/1972 | Ackerman et al. | 252/301.24 |
| 3,779,931 | 12/1973 | Fries | 8/111 |

FOREIGN PATENT DOCUMENTS

| | | | |
|---|---|---|---|
| 1,235,254 | 3/1967 | Fed. Rep. of Germany | 8/1 W |
| 1,519,470 | 6/1970 | Fed. Rep. of Germany | 8/1 W |
| 2,126,929 | 1/1973 | Fed. Rep. of Germany | 8/1 W |
| 669,896 | 4/1952 | United Kingdom | 8/1 W |
| 1,085,441 | 10/1967 | United Kingdom | 8/1 W |
| 1,348,638 | 3/1974 | United Kingdom | 8/1 W |

OTHER PUBLICATIONS

"Properties & Evaluation of Fluorescent Brightening Agents", J. Lanter, J. of Soc. of Dyers & Colorists, vol. 82, Apr. 1966, #4, pp. 125–132.

*Primary Examiner*—Herbert J. Lilling
*Attorney, Agent, or Firm*—Edward McC. Roberts; Prabodh I. Almaula

[57] ABSTRACT

The present invention relates to the optically brightening of organic fibrous materials with compositions containing a mixture of 1.2-bis-[5-methyl-benzimidazol-(2)-yl]-ethylene and 2.5-bis-[benzoxazol-(2)-yl-thiophene. The mixture of said brighteners show surprising synergistic effects.

5 Claims, No Drawings

OPTICALLY BRIGHTENING WITH A SYNERGISTIC MIXTURE

This is a divisional of application Ser. No. 497,970, filed on Aug. 16, 1976 U.S. Pat. No. 4,068,166.

The present invention provides a process for the fluorescent brightening of synthetic and semi-synthetic fibres, in particular those of polyester, polyamide or acetyl cellulose, e.g. cellulose acetate or cellulose triacetate, which comprises the use of mixtures consisting of 10% to 90% of a compound of the formula

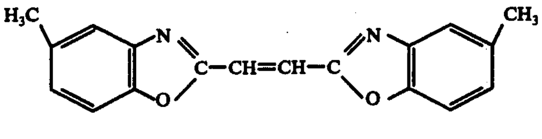
(1)

and 90% to 10% of a compound of the formula

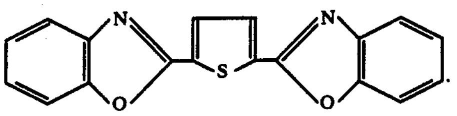
(2)

In the present advanced state of the art in the field of the fluorescent brightening of synthetic textiles, even a relatively small increase in the maximum white denotes a step forward. Moreover, economic and ecological considerations make it desirable to achieve a specific desired degree of whiteness with as little fluoresent brightener as possible.

The two compounds of the formulae (1) and (2) are among the best commercial products currently available for the fluorescent brightening of polyester and polyamide textiles. Taking this prior art as starting point, the surprising discovery has now been made that the combined use of these compounds produces a synergistic intensification of effect, i.e. the aggregate effect of a specific amount of the mixture is greater than the mere addition of the separate effects would have led one to expect.

This effect is all the more surprising since, from the colorimetric point of view, a diminution of effect is usually to be expected from mixtures of fluorescent brighteners, for it is known that the spectral distribution of the fluorescence necessarily becomes enlarged. This leads to a decrease in the saturation and consequently in the degree of whiteness. The slight increase in brightness brought about by the use of mixtures of fluorescent brighteners cannot compensate for this defect because the brightness does not contribute to the enhancement of the degree of whiteness to the same extent as the increase of the "blue fluorescence" or of the saturation. For this reason, the decrease in the white effect that normally occurs when using brightener mixtures is most marked when brighteners with ultra-reddish fluorescence are used in combination with brighteners with ultra-greenish fluorescence.

Surprisingly, the mixtures according to the invention exhibit such a pronounced synergistic effect that they are even able to overcompensate (in the positive sense) for the expected defects caused by enlargement of the spectral energy distribution of the fluorescence.

This surprising effect is accomplished according to the invention by using a mixture of 10–90%, preferably 25–75%, in particular 33–67%, of a compound of the formula (1) with 90–10%, preferably 75–25%, in particular 67–33%, of a compound of the formula (2) for the fluorescent brightening of organic fibrous material.

These new synergistic mixtures as defined herein are used for the fluorescent brightening of the most varied synthetic or semi-synthetic organic fibrous material.

As examples thereof there may be mentioned the following groups of organic materials, in so far as a fluorescent brightening of these is possible, it being understood that the survey which follows is not intended to express any limitation;

I. Synthetic organic materials or high molecular weight:

(a) polymerisation products which can be obtained by ring opening, for example, polyamides of the polycaprolactam type, and also polymers which are obtained both through polyaddition and through polycondensation, such as polyethers or polyacetals, (b) polycondensation products or precondensates based on bifunctional or polyfunctional compounds with condensable groups, their homocondensation and co-condensation products, and aftertreatment products, for example polyester, especially saturated (for example ethylene glycol terephthalic acid polyester) or unsaturated (for example maleic acid-dialcohol polycondensates as well as their crosslinking products with copolymerisable vinyl monomers), unbranched and branched (also including those based on polyhydric alcohols polyesters, polyamides (for example hexamethylenediamine adipate), and polycarbonates;

II. Semi-synthetic organic materials, for example, cellulose esters of varying degrees of esterification (so-called 2½ acetate or triacetate) or cellulose ethers, regenerated cellulose (viscose or cuprammonium cellulose), or their after-treatment products.

The organic materials to be brightened can be in the most diverse states of processing (raw materials, semi-finished goods or finished goods).

Fibrous materials can, for example, be in the form of endless filaments (stretched or unstretched), staple fibres, flocks, hanks, textile filaments, yarns, threads, non-wovens, felts, waddings, flocked structures or woven fabrics, bonded fabrics, knitted fabrics and papers, cardboards or paper pulps.

The compounds to be used according to the invention are of importance in particular for the treatment of textile fabrics. If fibres which are in the form of staple fibres or endless filaments or in the form of hanks, woven fabrics, knitted fabrics, nonwovens, flocked substrates or bonded fabrics, are to be brightened according to the invention, this is advantageously effected in an aqueous medium, wherein the compounds in question are present in a finely divided form (suspensions, so-called microdispersions, or optionally solutions.) If desired, dispersing agents, stabilisers, wetting agents and further assistants can be added during the treatment.

It can prove advantageous to carry out the treatment in a neutral or alkaline or acid bath. The treatment is usually carried out at temperatures of about 20° to 140° C, for example in the exhaustion process on polyester fibres at 50° to 130° C, above all at 97° C. Solutions or emulsions in organic solvents can also be used for the finishing according to the invention of textile substrates, as is practised in the dyeing industry in so-called solvent dyeing (pad-thermofixation application, or exhaustion dyeing processes in dyeing machines).

In certain cases, the fluorescent brighteners are made fully effective by an aftertreatment. This can, for example, be a chemical treatment (for example acid treatment), a thermal treatment (for example heat) or a combined chemical/thermal treatment. Thus, for example, the appropriate procedure to follow in brightening a number of fibre substrates, for example polyester fibres, with the fluorescent brighteners according to the invention, is to impregnate these fibres with the aqueous dispersions (or optionally also solutions) of the brighteners at temperatures below 75° C, for example at room temperature, and to subject them to a dry heat treatment at temperatures above 100° C, it being generally advisable additionally to dry the fibrous material beforehand at a moderately elevated temperature, for example at not less than 60° and up to about 130° C. The heat treatment in the dry state is then advantageously carried out at temperatures between 120° and 225° C, for example by heating in a drying chamber, by ironing within the specified temperature range or by treatment with dry, superheated steam. The drying and dry heat treatment can also be carried out in immediate succession or be combined in a single procedure.

The fluorescent brighteners according to the present invention can, for example, also be employed in the following use forms:

(a) mixed with dyestuffs (shading) or pigments (coloured pigments or especially, for example, white pigments), or as an additive to dye baths, printing pastes, discharge pastes or reserve pastes, or for the aftertreatment of dyeings, prints or discharge prints;

(b) mixed with "carriers", wetting agents, plasticisers, swelling agents, anti-oxidants, ultraviolet absorbers, heat stabilisers and chemical bleaching agents (chlorite bleach or bleaching bath additives);

(c) mixed with crosslinking agents or finishing agents (for example starch or synthetic finishes), and in combination with the most diverse textile finishing processes, for example flame-proof finishes, soft handle finishes, antisoiling finishes or anti-static or antimicrobial finishes;

(d) in combination with other substances with fluorescent brightening action.

The amount of the fluorescent brightener mixture to be used according to the invention, based on the material to be optically brightened, can vary within wide limits. It is possible to attain a distinct and durable effect even with very small amounts, in certain cases, for example, amounts of 0.0001 percent by weight. However, amounts of up to about 0.8 percent by weight and optionally of up to about 2 percent by weight can be employed. For most practical purposes, it is preferable to use amounts between 0.0005 and 0.5 percent by weight.

The fluorescent brightener mixtures are also particularly suitable for use as additives for wash liquors or heavy duty and domestic detergents, to which they can be added in various ways. They are appropriately added to wash liquors in the form of their solutions in water or organic solvents or in a finely divided form, as aqueous dispersions. They are advantageously added to domestic or heavy duty detergents in any stage of the manufacturing process of the detergents, for example to the slurry before the washing powder is atomised, or during the preparation of liquid detergent combinations. They can be added either in the form of a solution or dispersion in water or other solvents or, without assistants, as a dry brightening powder. For example, the brightener mixtures can be mixed, kneaded or ground with the active detergents and, in this form, admixed with the finished powder. However, they can also be sprayed in a dissolved or pre-dispersed form onto the finished detergent. Suitable detergents are the known mixtures of active detergents, for example soap in the form of chips and powders, synthetics, soluble salts of sulphonic acid half esters of higher fatty alcohols, arylsulphonic acids with higher and/or multiple alkyl substituents, sulphocarboxylic acid esters of medium to higher alcohols, fatty acid acylaminoalkyl or acylaminoaryl-glycerine-sulphonates and phosphoric acid esters of fatty alcohols. Suitable builders which can be used are, for example, alkali metal polyphosphates and polymetaphosphates, alkali metal pyrophosphates, alkali metal salts of carboxymethylcellulose and other soil redeposition inhibitors, and also alkali metal silicates, alkali metal carbonates, alkali metal borates, alkali metal perborates, nitrilotriacetic acid, ethylenediaminotetraacetic acid, and foam stabilisers such as alkanolamides of higher fatty acids. The detergents can further contain for example: anti-static agents, skin protection agents which restore fat, such as lanolin, enzymes, antimicrobial agents, perfumes and dye-stuffs.

The mixtures according to the invention are added in amounts of 0.01 to 1% or more, based on the weight of the liquid or pulverulent finished detergent. Washing liquors which contain the indicated amounts of the claimed brightener mixtures impart a brilliant appearance in daylight when used to wash textiles of polyamide fibres, resin finished cellulose fibres, polyester fibres etc.

The washing treatment is carried out as follows, for example:

The textiles are treated for 1 to 30 minutes at 20° to 100° C, preferably at 20° to 60° C, in a wash liquor which contains 1 to 10 g/kg of a built-up composite detergent and 0.05 to 1%, based on the weight of the detergent, of the claimed brightener mixture. The liquor ratio can be 1:3 to 1:50. After they have been washed the textiles are rinsed and dried in the usual manner. The wash liquor can contain 0.2 g/l of active chlorine (for example as hypochlorite) or 0.1 to 2 g/l of sodium perborate as a bleaching additive.

In the example, parts and percentages are always by weight, unless otherwise stated. Unless indicated to the contrary, melting points and boiling points are uncorrected.

EXAMPLES

The following mixtures of fluorescent brighteners of the formulae (1) and (2) were prepared for the Examples:

| | fluorescent brightener of the formula (1) percentage by weight | fluorescent brightener of the formula (2) percentage by weight |
|---|---|---|
| mixture A | 33.3 | 66.7 |
| mixture B | 50.0 | 50.0 |
| mixture C | 66.7 | 33.3 |

EXAMPLE 1

A wash liquor is prepared by dissolving 0.4 g of a detergent of the following composition in 100 ml of water:

15.7% of dodecylbenzenesulphonate
3.7% of fatty alcohol sulphonate 39.0% of sodium tripolyphosphate
2.7% of coconut fatty acid monoethanolamide
4.0% of sodium disilicate ($Na_2Si_2O_5$)
2.0% of magnesium silicate($MgSiO_3$)
1.0% of carboxymethyl cellulose
0.5% of the sodium salt of ethylenediaminotetraacetic acid
6.7% of water and made up to 100% with sodium sulphate (a portion of the sodiumsulphate can also be replaced by sodium perborate or another oxygen donor).

A concentration series containing between 0.05% and 0.4% of fluorescent brightener, based on the detergent, which corresponds to the conventional concentrations as used in practice, is prepared by adding to the wash liquor from 0.25 to 2.0 ml of a stock solution of 1 g of fluorescent brightener or brightener mixture in 1000 ml of dimethyl formamide. A piece of polyamide fabric weighing about 5 g is then put into these wash liquors at 25° C. After the fabric has been treated at 25° C over the course of 30 minutes, it is rinsed for 2 minutes in running cold water and dried for 20 minutes at 60° C. The treated fabric samples are then evaluated colorimetrically. Their degree of whiteness in CIBA-GEIGY White Scale units is calculated from the reflectance spectra using the CIBA-GEIGY whiteness formula**. The following results constitute average values of fourfold calculations:

**see J. of Color and Appearance 1, No. 5, 33-41 (1972)

(a) nylonstaple fabric (polyamide 66)

To bring an instrinsic white of 50 to an average white of 100 CIBA-GEIGY units, the following concentrations of fluorescent brightener are required (based on the detergent in %):

| | | |
|---|---|---|
| mixture A | according to the | 0.17 % |
| mixture C | invention | 0.12 % |
| compound (1) | for comparison | 0.40 % |
| compound (2) | | 0.40 % |

In mere additive behaviour of the two components, the requisite amount of mixture A is found to be 2.0%, and of mixture C to be 0.9%, which corresponds to fully ten times the amount of mixture actually required.

(b) Nylon Helanca (polyamide 6)

To bring an intrinsic white of 70 to an average white of 120 CIBA-GEIGY units, the following concentrations of brightener (in % based on the detergent) are required:

| | | |
|---|---|---|
| mixture A | according to the | 0.10 % |
| mixture C | invention | 0.11 % |
| compound (1) | for comparison | 0.40 % |
| compound (2) | | 0.24 % |

In mere additive behaviour of the two components, the requisite amount of mixture A is found to be 0.8%, and of mixture C to be 0.4%, which corresponds to four to eight times the amount of mixture actually required.

EXAMPLE 2

Using softened water, a bath is prepared which contains per liter between 0.05% and 0.4% (based on the fibre weight of the fabric to be brightened) of fluorescent brightener (predispersed with a small amount of water and about 1 g of a dispersant, e.g. an ethoxylated stearyl alcohol).

Polyester fabric (Dacron) is put into this bath at about 40° C in a liquor ratio of 1:25. The bath is warmed to 97° C over the course of 30 minutes and the temperature is held thereat for a further 30 minutes. After is has been rinsed and dried, the brightened fabric is evaluated visually (degree of whiteness in CIBA-GEIGY White Scale units; see reference in Example 1). To bring an intrinsic white of 50 to an average degree of whiteness of 150 CIBA-GEIGY units, the following concentrations are required (based on the weight of the fabric to be brightened):

| | | |
|---|---|---|
| mixture A | according to the | 0.08 % |
| mixture B | invention | 0.065% |
| mixture C | | 0.072% |
| compound (1) | for comparison | 0.28 % |
| compound (2) | | 0.2 % |

In mere additive behaviour of the two components, fully four times the requisite amount of mixtures A, B and C would be expected.

I claim:

1. A process for the fluorescent brightening of synthetic and semisynthetic fibers, in particular those of polyester, polyamide or acetyl cellulose, such as cellulose triacetate or, preferably, cellulose acetate, which comprises the step of applying to said fibers an effective amount of a mixture consisting of 33% to 67% of a compound of the formula (1)

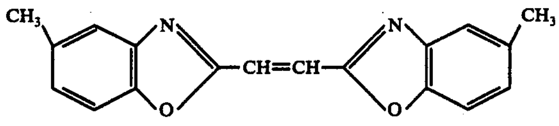

and 67% to 33% of a compound of the formula (2)

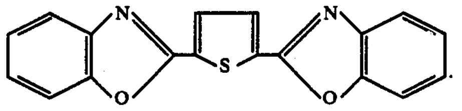

2. A process for the fluorescent brightening of synthetic and semi-synthetic fibres, in particular those of polyester and polyamide, according to claim 1.

3. A process according to claim 1, which comprises treating the material to be brightened by the exhaustion method at temperatures of 70° to 140° C.

4. A process according to claim 1, which comprises treating the material to be brightened in a wash bath at temperatures of 10° to 97° C.

5. A process according to claim 1, which comprises applying to the material to be brightened 0.001% to 0.5% of brightener mixture, based on the weight of the material.

* * * * *